Dec. 23, 1924. 1,520,402
W. M. CLEMANS
DISH
Filed March 1, 1923
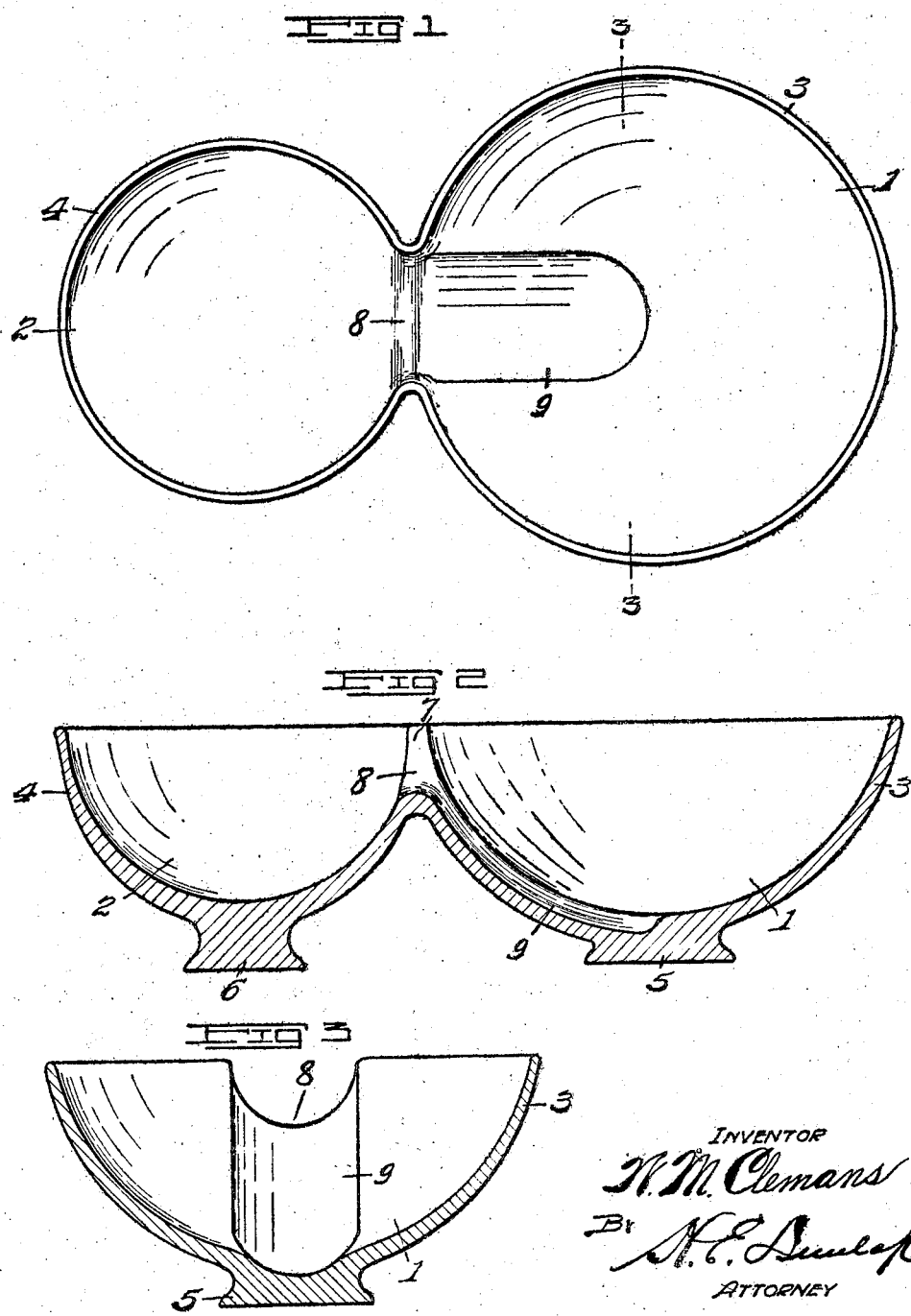

Patented Dec. 23, 1924.

1,520,402

UNITED STATES PATENT OFFICE.

WILLIAM M. CLEMANS, OF WHEELING, WEST VIRGINIA, ASSIGNOR OF ONE-HALF TO J. C. FEE AND ONE-HALF TO ROTH M. CLEMANS, GWENDOLYN C. CLEMANS, AND ELIZABETH C. CLEMANS, ALL OF WHEELING, WEST VIRGINIA.

DISH.

Application filed March 1, 1923. Serial No. 621,986.

*To all whom it may concern:*

Be it known that I, WILLIAM M. CLEMANS, a citizen of the United States of America, and resident of Wheeling, county of Ohio, and State of West Virginia, have invented certain new and useful Improvements in Dishes, of which the following is a specification.

This invention relates broadly to dishes, and more specifically to a dish for serving cereal foods and the like.

The primary object of the invention is to provide a dish designed for individual use in serving flaked cereal foods, as the common so-called prepared breakfast foods which are furnished in dry and crisp form ready to be served without cooking, said dish being of a double connected-bowl form adapted to contain the dry food and the milk or cream in separate bowl portions thereof.

A further object is to provide a dish of double or connected bowl form in which a division wall separating the bowls is provided with an embrasure-like passage through which the dry food of one compartment may be drawn as required by means of a spoon for mixing with the milk or other fluid contents of the other compartment.

With these and other objects in view, the invention resides in the features of construction and arrangement which will hereinafter be described, reference being had to the accompanying drawing, in which—

Figure 1 is a top plan view illustrating a preferred form of my invention;

Figure 2 is a central longitudinal section of the same; and—

Figure 3 is a cross section on line 3—3, Fig. 1.

Referring to said drawing, 1 and 2 indicate two separate chambers or compartments of substantially hemispherical shape formed in a dish which, as herein shown for illustrative purposes, comprises two integral bowl-shaped vessels 3 and 4 having base portions, or feet, 5 and 6 disposed in a common plane for resting upon a flat surface. Said bowls 3 and 4, which preferably differ somewhat in diameter and in capacity, are designed as containers, respectively, for a crisp or dry cereal food product and for a liquid, as milk, to be mixed with such product for moistening the latter just prior to the moment of conveying it to the mouth of the diner.

It may here be explained that practically all prepared cereal foods served with milk, when allowed to become soaked or saturated with milk are changed from their original crisp state or condition to a heavy and soggy mass which is comparatively tasteless and flavorless. If, on the other hand, a small quantity of such food be dipped in the milk immediately prior to conveying it to the mouth, the saturation of the food is prevented, with the result that the refreshing crispness and flavor thereof is retained, and there is required such mastication as produces a desirable flow of saliva for assisting in deglutition and for promoting digestion. Thus, the provision of the dish with the two chambers 1 and 2 for separately containing the prepared food in its dry form and the milk is designed to afford a practical and convenient means of enabling one to effect the momentary mixing referred to.

The two bowl-like containers 3 and 4, integrally formed as aforesaid, have an intermediate wall 7 which forms the junction therebetween, and an embrasure-like passage 8 is provided in said wall through which a small quantity of the contents of chamber 3 may be drawn by means of a spoon into the chamber 2 for dipping in the milk contained in the latter.

To facilitate the drawing of a spoonful of the dry food from the chamber 1 to the passage 8, a shallow furrow or channel 9 which has a concave curvature in cross section substantially corresponding to the lengthwise curvature of the bowl of a spoon is provided in the bowl 3, the same extending from a point adjacent to the center of the bottom of the bowl to said passage 3, as shown, and forming a spoon guide. Food drawn into said channel will be maintained in the spoon as the latter is drawn upward, in a manner which is readily apparent.

What is claimed is—

1. A one-piece dish having the form of two bowls of substantially even height and united throughout a portion of their heights by a common wall, said wall having an embrasure-like passage therein, one of said bowls having an internal spoon-guiding channel leading upward to said passage.

2. A dish comprising two bowl-shaped vessels of substantially even height formed integrally and having a wall common to both vessels extending downward a substantial distance from the level of their upper edges, said wall having an embrasure-like passage therein, one of said vessels having an internal channel in its wall leading upward to said passage and forming a guide for a spoon, said channel having a cross sectional curvature substantially corresponding to the longitudinal curvature of the bowl of a spoon.

In testimony whereof, I affix my signature in presence of two subscribing witnesses.

WILLIAM M. CLEMANS.

Witnesses:
G. D. SMITH,
H. E. DUNLAP.